(12) United States Patent
Gupta et al.

(10) Patent No.: US 12,175,732 B2
(45) Date of Patent: Dec. 24, 2024

(54) COMPUTATIONALLY EFFICIENT UNSUPERVISED DNN PRETRAINING

(71) Applicant: GM Global Technology Operations LLC, Detroit, MI (US)

(72) Inventors: Siddhartha Gupta, Rochester Hills, MI (US); Wei Tong, Troy, MI (US); Upali P. Mudalige, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 384 days.

(21) Appl. No.: 17/817,704

(22) Filed: Aug. 5, 2022

(65) Prior Publication Data

US 2024/0046627 A1 Feb. 8, 2024

(51) Int. Cl.
| | |
|---|---|
| *G06V 10/778* | (2022.01) |
| *G06T 7/11* | (2017.01) |
| *G06V 10/25* | (2022.01) |
| *G06V 10/26* | (2022.01) |
| *G06V 10/74* | (2022.01) |
| *G06V 10/774* | (2022.01) |

(52) U.S. Cl.
CPC ............ *G06V 10/778* (2022.01); *G06T 7/11* (2017.01); *G06V 10/25* (2022.01); *G06V 10/26* (2022.01); *G06V 10/761* (2022.01); *G06V 10/774* (2022.01); *G06T 2207/10024* (2013.01); *G06T 2207/20081* (2013.01); *G06T 2207/20084* (2013.01); *G06T 2207/20132* (2013.01)

(58) Field of Classification Search
CPC ...... G06V 10/778; G06V 10/25; G06V 10/26; G06V 10/761; G06V 10/774; G06V 20/64; G06V 10/806; G06V 20/58; G06V 10/82; G06T 7/11; G06T 2207/10024; G06T 2207/20081; G06T 2207/20084; G06T 2207/20132; G06N 3/063; G06N 3/088
See application file for complete search history.

(56) References Cited

U.S. PATENT DOCUMENTS

2023/0138380 A1* 5/2023 Chen .................. G06F 18/2148
382/131

* cited by examiner

*Primary Examiner* — Christopher Wait
(74) *Attorney, Agent, or Firm* — Vivacqua Crane, PLLC (57) ABSTRACT

A system comprises a computer including a processor and a memory. The memory includes instructions such that the processor is programmed to determine a pairwise region of interest feature similarity based on features extracted from a first cropped image portion and corresponding point cloud data and features extracted from a second cropped image portion and corresponding point cloud data. The processor is also programmed to determine a loss using a loss function based on the pairwise region of interest feature similarity, wherein the loss function corresponds to at least one a first deep neural network or a second deep neural network. The processor is also programmed to update at least one weight of the at least one of the first deep neural network or the second deep neural network based on the loss.

20 Claims, 4 Drawing Sheets

COMPUTATIONALLY EFFICIENT UNSUPERVISED DNN PRETRAINING

INTRODUCTION

The present disclosure relates to pretraining deep neural networks using self-supervised techniques.

Various sensors can provide data to identify objects in a physical, i.e., real-world, environment around a vehicle. For example, sensors such as video cameras, lidar, radar, ultrasonic sensors, etc. can provide data to identify an object. A vehicle computer can receive the data from the sensors while operating a vehicle in the environment.

SUMMARY

A system comprises a computer including a processor and a memory. The memory includes instructions such that the processor is programmed to determine a pairwise region of interest feature similarity based on features extracted from a first cropped image portion and corresponding point cloud data and features extracted from a second cropped image portion and corresponding point cloud data. The processor is also programmed to determine a loss using a loss function based on the pairwise region of interest feature similarity, wherein the loss function corresponds to at least one a first deep neural network or a second deep neural network. The processor is also programmed to update at least one weight of the at least one of the first deep neural network or the second deep neural network based on the loss.

In other features, the processor is further programmed to receive an image and corresponding cloud point data.

In other features, the processor is further programmed to perform a random crop function on the image and the corresponding cloud point data to generate the first cropped image portion and the second cropped image portion.

In other features, the image comprises a two-dimensional image.

In other features, the two-dimensional image comprises a Red-Green-Blue (RGB) image.

In other features, the first deep neural network comprises a two-dimensional convolutional neural network.

In other features, the second deep neural network comprises a three-dimensional convolutional neural network.

A vehicle can include a computer. The computer includes a processor and a memory, and the memory includes instructions such that the processor is programmed to determine a pairwise region of interest feature similarity based on features extracted from a first cropped image portion and corresponding point cloud data and features extracted from a second cropped image portion and corresponding point cloud data. The processor is also programmed to determine a loss using a loss function based on the pairwise region of interest feature similarity, wherein the loss function corresponds to at least one a first deep neural network or a second deep neural network. The processor is also programmed to update at least one weight of the at least one of the first deep neural network or the second deep neural network based on the loss.

In other features, the processor is further programmed to receive an image and corresponding cloud point data.

In other features, the processor is further programmed to perform a random crop function on the image and the corresponding cloud point data to generate the first cropped image portion and the second cropped image portion.

In other features, the image comprises a two-dimensional image.

In other features, the two-dimensional image comprises a Red-Green-Blue (RGB) image.

In other features, the first deep neural network comprises a two-dimensional convolutional neural network.

In other features, the second deep neural network comprises a three-dimensional convolutional neural network.

A determining a pairwise region of interest feature similarity based on features extracted from a first cropped image portion and corresponding point cloud data and features extracted from a second cropped image portion and corresponding point cloud data. The method also includes determining a loss using a loss function based on the pairwise region of interest feature similarity, wherein the loss function corresponds to at least one a first deep neural network or a second deep neural network and updating at least one weight of the at least one of the first deep neural network or the second deep neural network based on the loss.

In other features, the method includes receiving an image and corresponding cloud point data.

In other features, the method includes performing a random crop function on the image and the corresponding cloud point data to generate the first cropped image portion and the second cropped image portion.

In other features, the image comprises a two-dimensional image.

In other features, the first deep neural network comprises a two-dimensional convolutional neural network.

In other features, the second deep neural network comprises a three-dimensional convolutional neural network.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Typically, neural networks, such as a convolutional neural networks, may be trained using labeled training data. Labeled training data may include images with bounding boxes that include one or more labeled objects to be detected by the object detector. However, annotating training data to include bounding boxes and labels, or even image labels as in weakly supervised object detection, can be resource intensive and time consuming. The present disclosure provides a system of self-supervised learning such that annotated training data is not required.

Figure 1:
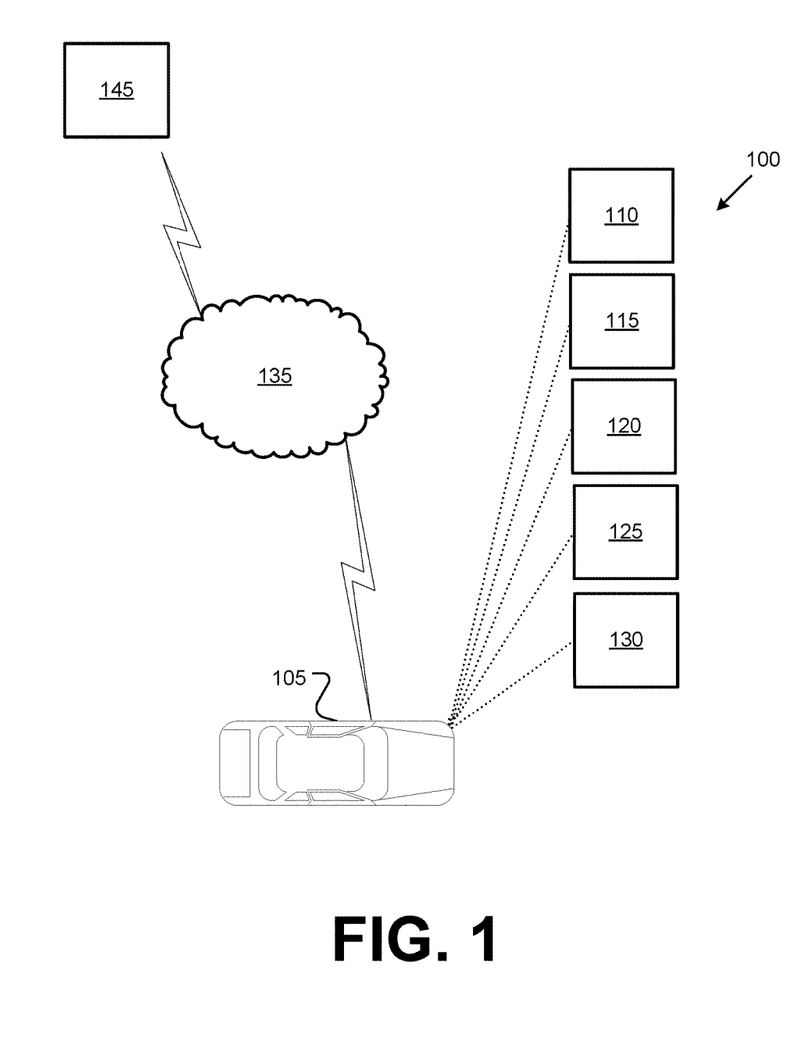
FIG. 1 is a block diagram of an example system including a vehicle.

FIG. 1 is a block diagram of an example system 100. The system 100 includes a vehicle 105, which can comprise a land vehicle such as a car, truck, etc., an aerial vehicle, and/or an aquatic vehicle. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects, etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2I) wireless communications to another vehicle, to (typically via the network 135) a remote server 145, such as an edge server. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

Figure 2:
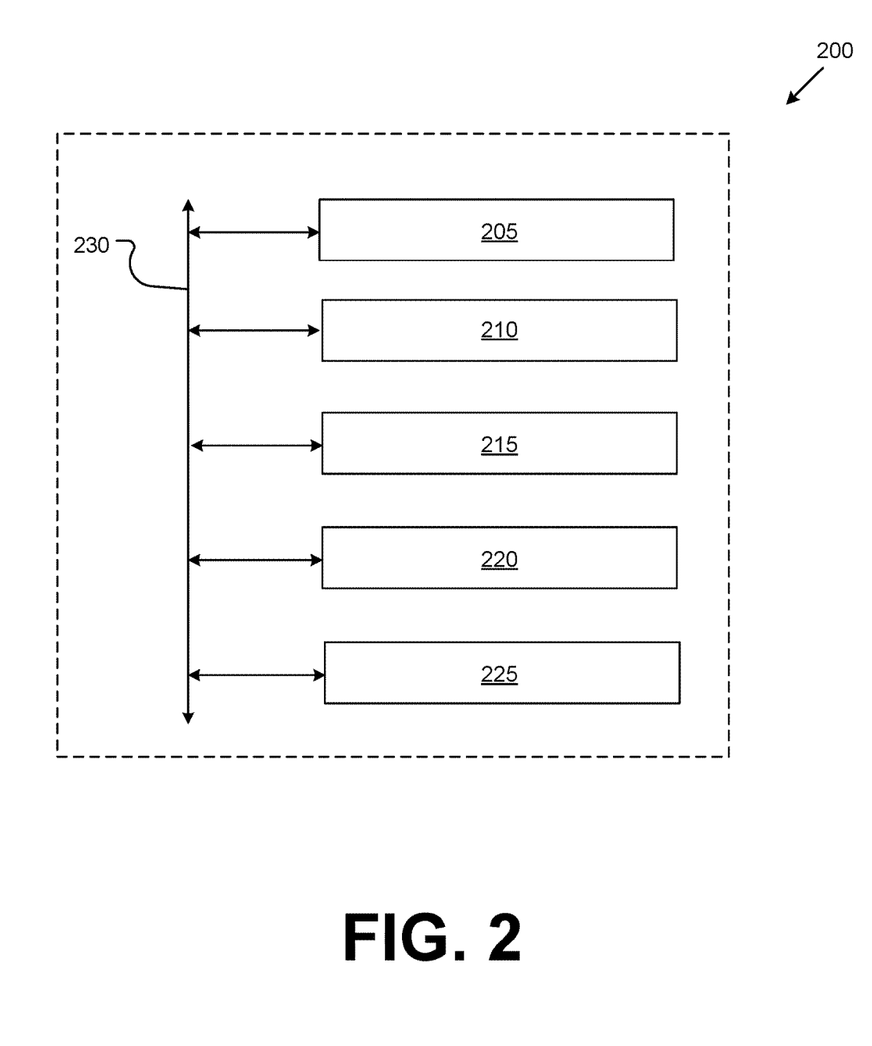
FIG. 2 is a block diagram of an example computing device.

FIG. 2 illustrates an example computing device 200 i.e., computer 110, server(s) 145, that may be configured to perform one or more of the processes described herein. As shown, the computing device can comprise a processor 205, memory 210, a storage device 215, an I/O interface 220, and a communication interface 225. Furthermore, the computing device 200 can include an input device such as a touchscreen, mouse, keyboard, etc. In certain implementations, the computing device 200 can include fewer or more components than those shown in FIG. 2.

In particular implementations, processor(s) 205 includes hardware for executing instructions, such as those making up a computer program. As an example, and not by way of limitation, to execute instructions, processor(s) 205 may retrieve (or fetch) the instructions from an internal register, an internal cache, memory 210, or a storage device 215 and decode and execute them.

The computing device 200 includes memory 210, which is coupled to the processor(s) 205. The memory 210 may be used for storing data, metadata, and programs for execution by the processor(s). The memory 210 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 210 may be internal or distributed memory.

The computing device 200 includes a storage device 215 includes storage for storing data or instructions. As an example, and not by way of limitation, storage device 215 can comprise a non-transitory storage medium described above. The storage device 215 may include a hard disk drive (HDD), flash memory, a Universal Serial Bus (USB) drive or a combination of these or other storage devices.

The computing device 200 also includes one or more input or output ("I/O") devices/interfaces 220, which are provided to allow a user to provide input to (such as user strokes), receive output from, and otherwise transfer data to and from the computing device 200. These I/O devices/interfaces 220 may include a mouse, keypad or a keyboard, a touch screen, camera, optical scanner, network interface, modem, other known I/O devices or a combination of such I/O devices/interfaces 220. The touch screen may be activated with a writing device or a finger.

The I/O devices/interfaces 220 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 220 is configured to provide graphical data to a display for presentation to a user. The graphical data may be representative of one or more graphical user interfaces and/or any other graphical content as may serve a particular implementation.

The computing device 200 can further include a communication interface 225. The communication interface 225 can include hardware, software, or both. The communication interface 225 can provide one or more interfaces for communication (such as, for example, packet-based communication) between the computing device and one or more other computing devices 200 or one or more networks. As an example, and not by way of limitation, communication interface 225 may include a network interface controller (NIC) or network adapter for communicating with an Ethernet or other wire-based network or a wireless NIC (WNIC) or wireless adapter for communicating with a wireless network, such as a WI-FI. The computing device 200 can further include a bus 230. The bus 230 can comprise hardware, software, or both that couples components of the computing device 200 to each other.

Figure 3:
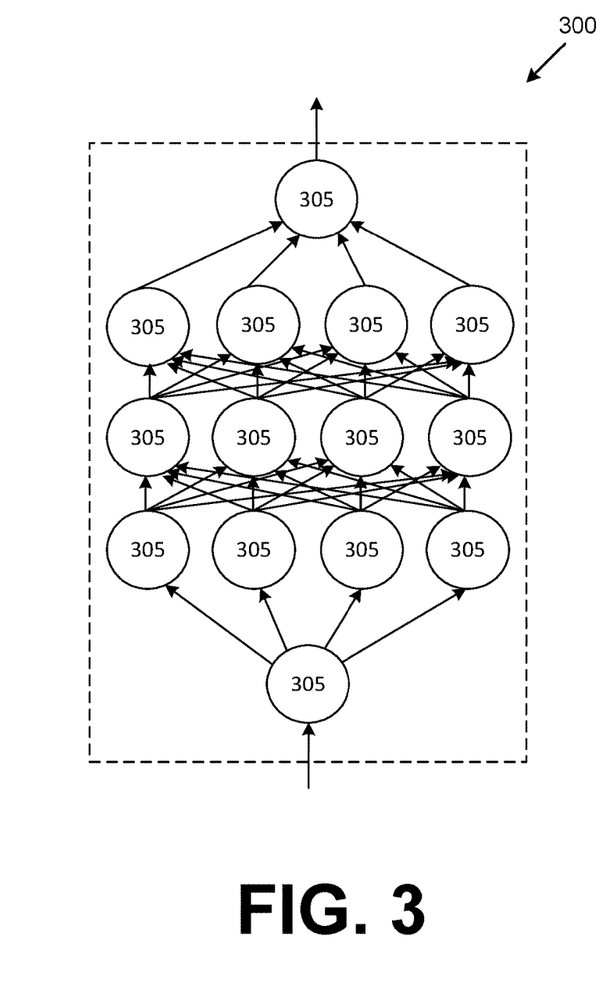
FIG. 3 is a diagram illustrating an example deep neural network.

FIG. 3 is a diagram of an example deep neural network (DNN) 300. The DNN 300 may be representative of the neural networks described herein. The DNN 300 includes multiple nodes 305, and the nodes 305 are arranged so that the DNN 300 includes an input layer, one or more hidden layers, and an output layer. Each layer of the DNN 400 can include a plurality of nodes 305. While FIG. 3 illustrates three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to activation function, which in turn provides a connected neuron 305 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept data as input and generate an output based on the input. The DNN 300 can be trained with ground truth data, i.e., data about a real-world condition or state. For example, the DNN 300 can be trained with ground truth data or updated with additional data by a processor. Weights can be initialized by using a Gaussian distribution, for example, and a bias for each node 305 can be set to zero. Training the DNN 300 can including updating weights and biases via suitable techniques such as back-propagation with optimizations. Ground truth data can include, but is not limited to, data classifying and/or identifying objects within a point cloud.

As discussed herein, the DNN 300 can comprise a convolutional neural network (CNN). A CNN is a class of deep, feedforward artificial neural networks that can use a variation of multilayer perceptrons designed to require minimal preprocessing. Through training, a CNN determines filters that can be used to identify features of interest, regions of interest, and so forth. In other words, a CNN can use one or more filters to extract features from input data.

In various implementations, the DNN 300 can comprise a two-dimensional (2D) CNN and/or a three-dimensional (3D) CNN that perform feature extraction. Within the present context, temporal and/or point cloud data can provided to the 3D CNN and spatial data can be provided to the 2D CNN, as discussed in further detail below.

Figure 4:
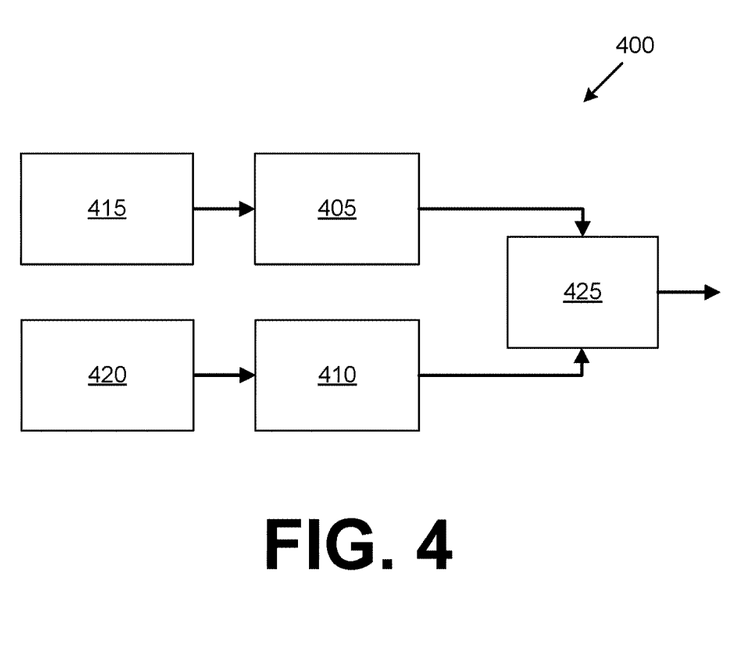
FIG. 4 is a block diagram illustrating an example feature extractor.

FIG. 4 illustrates an example feature extractor 400 according to an example implementation of the present disclosure. As discussed herein, the feature extractor 400 is pretrained using images and corresponding point cloud data. The images and point cloud data do not include labels, masks, bounding boxes, or the like. It is understood that the masks and/or bounding boxes are not necessarily human annotated.

As shown, the feature extractor 400 can include a first convolutional neural network (CNN) 405, a second convolutional neural network (CNN) 410, and a feature fusion module 425. Within this implementation, the first CNN 405 comprises a 2D CNN, and the second CNN 410 comprises a 3D CNN.

Each CNN 405, 410 receives sensor data captured by the sensors 115. The sensor data can comprise image data 415 and point cloud data 420 captured by the sensors 115. In an example implementation, image data 415 can comprise Red-Green-Blue (RGB) color images captured by camera sensors 115, and point cloud data 420 can comprise a dataset created when an area is scanned by lidar and/or radar sensors 115.

The CNNs 405, 410 each output a feature map based on the respective input. Each feature map is provided to the feature fusion module 425 as input. The feature fusion module 425 can fuse features from the received feature maps. The feature fusion module 425 can use various fusion techniques to fuse the features with one another. For instance, the fusion techniques may include, but are not limited to, competitive fusion techniques, complementary sensor techniques, and/or cooperative fusion techniques. The feature fusion module 425 can output data representing fused features to the computer 110 for further processing. For example, the computer 110 may include additional software modules that provide segmentation functionality, detection functionality, classification functionality, tracking functionality, and the like.

Figure 5:
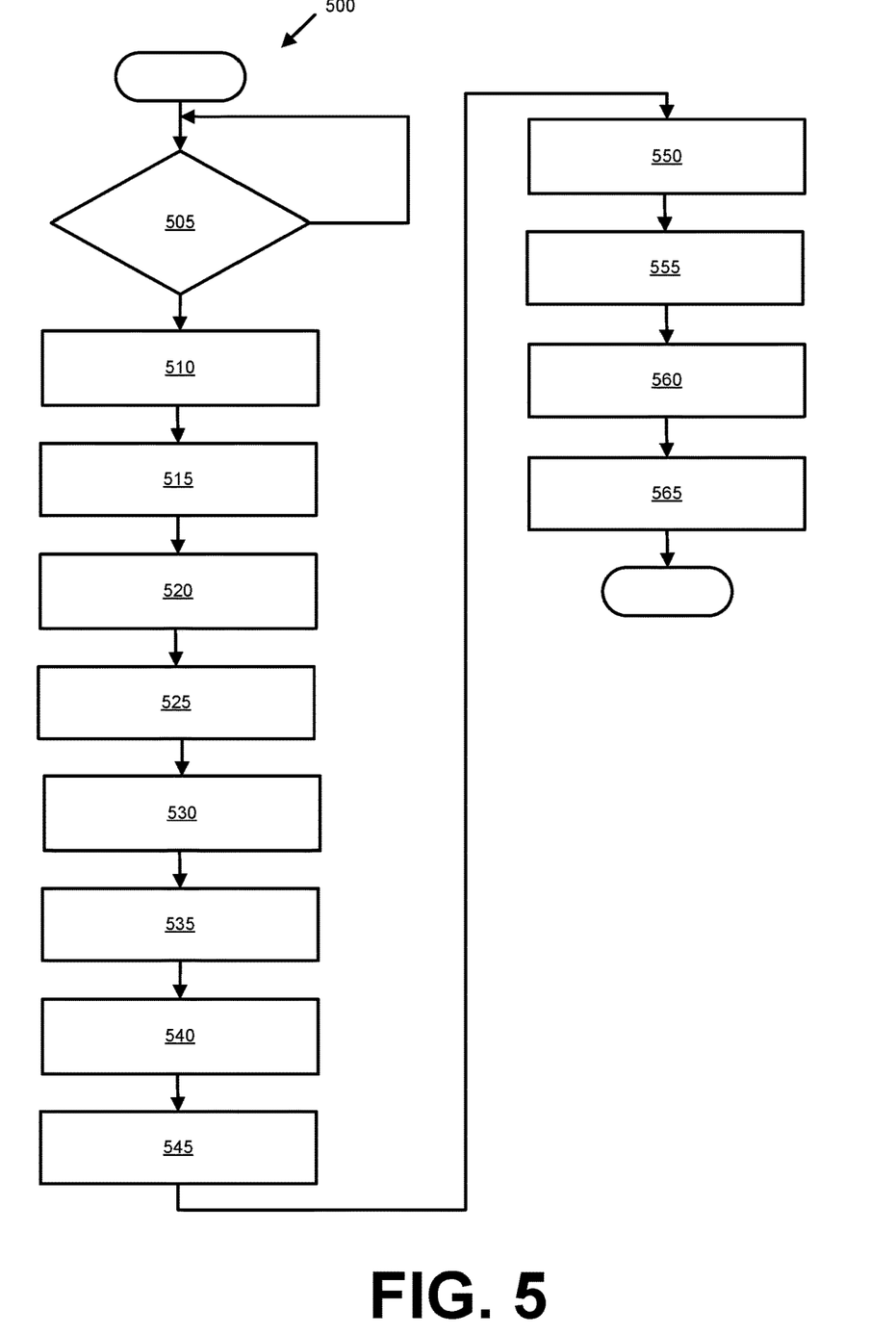
FIG. 5 is a flow diagram illustrating an example process for pretraining a feature extractor using self-supervised techniques.

FIG. 5 is a flowchart of an exemplary process 500 for pretraining a feature extractor, such as feature extractor 400, using self-supervised techniques. Blocks of the process 500 can be executed by the computer 110 or the server 145. The process 500 begins at block 505 in which a determination of whether data is received. In an example implementation, the data can comprise images, such as two-dimensional (2D) RGB images and corresponding point cloud data. If the data has not been received, the process 500 returns to block 505.

Otherwise, at block 510, one or more regions of interest (RoIs) are determined within the image and corresponding point cloud data. In an example implementation, the first CNN 405 can determine regions of interest within the image data, and the second CNN 410 can determine regions of interest within the point cloud data. In other example implementations, regions of interest in images can be computed using image-processing algorithms, such as active contours or region-growing algorithms. As both image and corresponding point-cloud data is available, an initial seed for region-growing super-pixel segmentation algorithm can be initialized using point cloud projected in the 2D image space. This region-growing super-pixel segmentation algorithm can then segment the image into potential RoIs.

Once RoIs in image are computed, a corresponding frustum in the point cloud will be extracted. Then, the image RoI features are cropped from the 2D features and point-cloud frustum features are cropped from the 3D features.

At block 515, at least two (2) random crop processes are performed on the image data and the corresponding point cloud data. The cropping process can result in at least two different views within the image data and the corresponding point cloud data. At block 520, a region of interest correspondence is determined based on the regions of interest from the non-cropped data, cropped data corresponding to a first crop, and cropped data corresponding to a second crop.

At block 525, the image and the point cloud features are determined corresponding to the first crop. At block 530, the image and the point cloud features are determined corresponding to the second crop. It is understood that blocks 525 and 530 may occur prior to block 520.

At block 535, the region of interest features are computed corresponding to the first crop. At block 540, the region of interest features are computed corresponding to the second crop. At block 545, the computer 110 and/or the server 145 applies suitable projector and prediction functions to the region of interest features corresponding to the first crop, i.e., features within the regions of interest corresponding to the first crop. At block 550, the computer 110 and/or the server 145 applies suitable projector and prediction functions to the region of interest features corresponding to the second crop, i.e., features within the regions of interest corresponding to the second crop.

At block 555, the computer 110 and/or the server 145 calculates a pairwise region of interest feature similarity. In an example implementation, the computer 110 and/or the server 145 calculates the pairwise region of interest feature similarity using a log softmax function applied to a features dot product calculation. The features dot product calculation can be determined using suitable matrix multiplication applied to the region of interest correspondence and the features within the regions of interest for the first crop and the second crop.

At block 560, the computer 110 and/or the server 145 calculates a loss based on a loss function of the feature extractor 400. At block 565, one or more weights and/or parameters of the first CNN 405, the second CNN 410, projection functions, and/or predictor functions are updated based on the calculated loss. The weights and/or parameters can be updated using suitable backpropagation techniques. In an example implementation, the weights and/or parameters of the first CNN 405 can be updated using backpropagation whereas weights of the second CNN 410 can be updated by backpropagation or as exponential moving average of the updated weights of the first CNN 405. The process 500 then ends. Once trained via the self-supervised training process described herein, the feature extractor 400 can be used by the computer 110 to operate the vehicle 105 in an autonomous or a semi-autonomous state.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:

determine a pairwise region of interest feature similarity based on features extracted from a first cropped image portion and corresponding point cloud data and features extracted from a second cropped image portion and corresponding point cloud data;

determine a loss using a loss function based on the pairwise region of interest feature similarity, wherein the loss function corresponds to at least one a first deep neural network or a second deep neural network; and update at least one weight of the at least one of the first deep neural network or the second deep neural network based on the loss.

2. The system of claim 1, wherein the processor is further programmed to receive an image and corresponding cloud point data.

3. The system of claim 2, wherein the processor is further programmed to perform a random crop function on the image and the corresponding cloud point data to generate the first cropped image portion and the second cropped image portion.

4. The system of claim 2, wherein the image comprises a two-dimensional image.

5. The system of claim 4, wherein the two-dimensional image comprises a Red-Green-Blue (RGB) image.

6. The system of claim 1, wherein the first deep neural network comprises a two-dimensional convolutional neural network.

7. The system of claim 6, wherein the second deep neural network comprises a three-dimensional convolutional neural network.

8. A vehicle including a computer, the computer including a processor and a memory, the memory including instructions such that the processor is programmed to:
   determine a pairwise region of interest feature similarity based on features extracted from a first cropped image portion and corresponding point cloud data and features extracted from a second cropped image portion and corresponding point cloud data;
   determine a loss using a loss function based on the pairwise region of interest feature similarity, wherein the loss function corresponds to at least one a first deep neural network or a second deep neural network; and
   update at least one weight of the at least one of the first deep neural network or the second deep neural network based on the loss.

9. The vehicle of claim 8, wherein the processor is further programmed to receive an image and corresponding cloud point data.

10. The vehicle of claim 9, wherein the processor is further programmed to perform a random crop function on the image and the corresponding cloud point data to generate the first cropped image portion and the second cropped image portion.

11. The vehicle of claim 8, wherein the image comprises a two-dimensional image.

12. The vehicle of claim 11, wherein the two-dimensional image comprises a Red-Green-Blue (RGB) image.

13. The vehicle of claim 8, wherein the first deep neural network comprises a two-dimensional convolutional neural network.

14. The vehicle of claim 13, wherein the second deep neural network comprises a three-dimensional convolutional neural network.

15. A method comprising:
   determining a pairwise region of interest feature similarity based on features extracted from a first cropped image portion and corresponding point cloud data and features extracted from a second cropped image portion and corresponding point cloud data;
   determining a loss using a loss function based on the pairwise region of interest feature similarity, wherein the loss function corresponds to at least one a first deep neural network or a second deep neural network; and
   updating at least one weight of the at least one of the first deep neural network or the second deep neural network based on the loss.

16. The method of claim 15, the method further comprising: receiving an image and corresponding cloud point data.

17. The method of claim 16, the method further comprising: performing a random crop function on the image and the corresponding cloud point data to generate the first cropped image portion and the second cropped image portion.

18. The method of claim 16, wherein the image comprises a two-dimensional image.

19. The method of claim 15, wherein the first deep neural network comprises a two-dimensional convolutional neural network.

20. The method of claim 19, wherein the second deep neural network comprises a three-dimensional convolutional neural network.

* * * * *